United States Patent
Kitagawa

(10) Patent No.: US 8,434,468 B2
(45) Date of Patent: May 7, 2013

(54) WIRE SAW APPARATUS

(75) Inventor: Koji Kitagawa, Nishishirakawa (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 435 days.

(21) Appl. No.: 12/733,528

(22) PCT Filed: Oct. 15, 2008

(86) PCT No.: PCT/JP2008/002915
§ 371 (c)(1),
(2), (4) Date: Mar. 23, 2010

(87) PCT Pub. No.: WO2009/060562
PCT Pub. Date: May 14, 2009

(65) Prior Publication Data
US 2010/0206285 A1    Aug. 19, 2010

(30) Foreign Application Priority Data
Nov. 8, 2007   (JP) .................. 2007-290834

(51) Int. Cl.
*B28D 1/08* (2006.01)
*B28D 5/04* (2006.01)
*B24B 57/02* (2006.01)

(52) U.S. Cl.
USPC ................... 125/16.02; 125/38; 451/446

(58) Field of Classification Search ............... 125/16.02, 125/19, 21, 38; 451/446, 451, 455; 83/651.1
See application file for complete search history.

(56) References Cited

FOREIGN PATENT DOCUMENTS

| JP | A 9-193140 | 7/1997 |
| JP | A 9-262826 | 10/1997 |
| JP | A 9-262829 | 10/1997 |
| JP | A 2004-114249 | 4/2004 |
| JP | A-2005-276851 | 10/2005 |
| JP | A-2006-305685 | 11/2006 |
| JP | A 2007-273711 | 10/2007 |

OTHER PUBLICATIONS

International Search Report issued in corresponding International Application No. PCT/JP2008/002915, mailed Nov. 11, 2008. (with English-language translation).
Apr. 17, 2012 Office Action issued in Japanese Patent Application No. 2007-290834 (with partial translation).
Dec. 1, 2012 Search Report issued in Taiwanese Patent Application No. 097142687 (with Translation).

*Primary Examiner* — Dung Van Nguyen
(74) *Attorney, Agent, or Firm* — Oliff & Berridge, PLC

(57) ABSTRACT

A wire saw apparatus having: a wire wound around grooved rollers and axially travels in a reciprocating direction; a nozzle for supplying a slurry; and a work-feeding mechanism feeding a work toward the wire, and slicing into wafers by pressing and feeding the work against the wire traveling in a reciprocating direction while a slurry is supplied to the wire through the nozzle. A work-holding portion holds the work through a pad plate adhered to the work and a work plate, plate-shaped or block-shaped slurry-splash-blocking members are arranged in the direction of a right angle to a row of the wire wound around the grooved rollers below the work-holding portion and on both the wire cut-in side and a wire cut-out side.

4 Claims, 11 Drawing Sheets

(A)

wire travel direction (B)

cut-in portion
slurry
cut-out portion (C)

slurry slurry taper (A)

(B)

WIRE SAW APPARATUS

TECHNICAL FIELD

The present invention relates to a wire saw apparatus for slicing a work (e.g., a silicon ingot or an ingot of a compound semiconductor) into many wafers by using the wire saw apparatus.

BACKGROUND ART

In recent years, an increase in size of a wafer is demanded, and a wire saw apparatus is mainly used to slice a work with this increase in size.

The wire saw apparatus is an apparatus that causes a wire (a high-tensile steel wire) to travel at a high speed and presses a work against the wire to be sliced while applying a slurry to the wire, thereby slicing the work into many wafers at the same time (see Japanese Unexamined Patent Publication (Kokai) No. 262826-1997).

Here, FIG. 7 shows an outline of an example of a conventionally general wire saw apparatus.

As shown in FIG. 7, a wire saw 101 mainly includes a wire 102 for slicing an work, grooved rollers 103 around which the wire 102 is wound, a mechanism 104 for giving the wire 102 a tensile force, a mechanism 105 for feeding the work to be sliced downward, and a mechanism 106 for supplying a slurry at the time of slicing.

The wire 102 is unreeled from one wire reel 107 and reaches the grooved rollers 103 through the tensile-force-giving mechanism 104 formed of a powder clutch (a constant torque motor 109), a dancer roller (a dead weight) (not shown) and so on through a traverser 108. The wire 102 is wound around this grooved rollers 103 for approximately 300 to 400 turns, and then taken up by a wire reel 107' through the other tensile-force-giving mechanism 104'.

Moreover, each of the grooved rollers 103 is a roller that has a steel cylinder of which a polyurethane resin is pressed in peripheral part and has grooves formed at a fixed pitch on a surface thereof, and the wound wire 102 can be driven in a reciprocating direction in a predetermined cycle by a driving motor 110.

It is to be noted that such an work-feeding mechanism 105 as shown in FIG. 8 feeds the work toward the wire 102 wound around the grooved rollers 103 by holding and pushing down the work at the time of slicing the work. This work-feeding mechanism 105 includes an work-holding portion 111 that is used to hold and push down the work and an LM guide 112. Driving the work-holding portion 111 along the LM guide 112 under control of a computer enables feeding the work at a previously programmed feed speed.

It is to be noted that the work is adhered to a pad plate 114. The pad plate 114 is held by a work plate 113. The work is held by the work-holding portion 111 through the pad plate 114 and the work plate 113.

Moreover, as shown in FIG. 7 nozzles 115 are provided near the grooved rollers 103 and the wound wire 102, and a slurry can be supplied to the wire 102 from a slurry tank 116 at the time of slicing. Additionally, a slurry chiller 117 is connected with the slurry tank 116 so that a temperature of the slurry to be supplied can be adjusted.

With the wire saw apparatus 101, an appropriate tensile force is applied to the wire 102 by the tensile-force-giving mechanism 104, and the work is sliced while the wire 102 is caused to travel in a reciprocating direction by the driving motor 110.

However, the present inventor sliced the work into wafers using the general wire saw apparatus as described above and examined a shape of the sliced wafer. As a result, a large Warp was generated. The Warp is one of an important quality for slicing of a semiconductor wafer. Thus, the more quality demand of a product increases, the more demand of reduction of the Warp increases.

DISCLOSURE OF INVENTION

Thus, the present inventor examined the shape of the sliced wafer in detail. As a result the present inventor discovered that the Warp was degraded particularly near both end faces of the work. Furthermore, a detailed examination into the wafer having the degraded Warp led to a discovery that the Warp was degraded notably in the last half of slicing portion.

In order to investigate the cause of the degradation of the Warp, the present inventor observed a condition of the work during slicing.

The slurry is supplied to a work-slicing portion by applying the slurry from above a row of the wire through the nozzle, which is located in the side of the work, and driving the wire axially at a high speed at the time of slicing. However, the present inventor discovered that in this case most of the slurry that adhere to the wire and are carried to the vicinity of the work collide with a side face of the work (a wire cut-in portion of the work) and then fall downward from the work.

In particular regarding a semiconductor silicon ingot, by reason of a cylinder shape of the work when the work is sliced from a slicing start portion to a central portion of the work, the slurry collided with the side face of the work as described above falls downward from the wire cut-in portion rapidly. FIG. 9 shows a flow of the slurry at the time of slicing between the slicing start portion and the central portion of the work. It is to be noted that the figure shows an example in the case that the wire travels from left to the right as one faces.

However, when the work is further cut into and a portion after the central portion of the work is sliced, the slurry collides with the side face of the cylinder-shaped work to splash upward from the work and then falls on the work. FIG. 10 shows a flow of the slurry at the time of slicing the portion after the central portion of the work. It is understood that the slurry splashing upward from the work reaches the work-holding portion and the work plate, and then falls onto an inside of the work. Furthermore, the present inventor discovered that the slurry falling on the work flows in a portion that is already cut into by the wire.

FIG. 11 shows a condition where the slurry flows in the portion that is cut into by the wire. This is a figure that shows the side face of the work in the direction along the wire row. The slurry flowing in the portion that is cut into by the wire has a higher viscosity than that is supplied to the wire first due to evaporating water by slicing heat and the like. This slurry having a high viscosity accumulates particularly in the vicinity of the lower end (the slicing start portion) of the work (refer to P in FIG. 11). As a result, the portion that is already cut into wafers is likely to adhere one another. On the other hand, the vicinity of the central portion of the work (refer to Q in FIG. 11) vibrates (a bellows motion) in the direction of a right angle to the wire row during slicing in state where the vicinity of the lower end of the work that is cut into wafers and that adheres one another with the slurry as described above, and the vicinity of the upper end of the work that is not cut into are used as a fulcrum point. The present inventor discovered that an amplitude of the vibration of the bellows motion becomes larger as it is closer to the end face side of the work.

Furthermore, the present inventor thought that by reason of the bellows motion of the work as described above, slicing particularly in the vicinity of the slicing end portion is influenced and the Warp of the work degrades.

Therefore, in view of the above-explained problems, it is an object of the present invention to provide a wire saw apparatus in which a bellows motion of the work caused by the slurry splashing from the wire cut-in portion of the work can be suppressed and the Warp of the wafer to be sliced can be improved.

To achieve this object, the present invention provides a wire saw apparatus having at least a wire which is wound around a plurality of grooved rollers and axially travels in a reciprocating direction; a nozzle for supplying a slurry to the wire; and a work-feeding mechanism which feeds a work to be sliced toward the wire by holding and pushing down the work, and slicing the work into wafers by pressing and feeding the work held by the work-feeding mechanism against the wire traveling in a reciprocating direction with the work cut into while a slurry is supplied to the wire through the nozzle, wherein a work-holding portion of the work-feeding mechanism holds the work through a pad plate adhered to the work to be sliced and a work plate holding the pad plate, a plate-shaped or block-shaped slurry-splash-blocking members for blocking the slurry splashing from a wire cut-in portion of the work are arranged in the direction of a right angle to a row of the wire wound around the grooved rollers below the work-holding portion and on both the wire cut-in side and a wire cut-out side.

In this manner, since the plate-shaped or block-shaped slurry-splash-blocking members for blocking the slurry splashing from the wire cut-in portion of the work are arranged in the direction of a right angle to a row of the wire wound around the grooved rollers below the work-holding portion and on both the wire cut-in side and a wire cut-out side in the wire saw apparatus according to the present invention, the wire saw apparatus can prevent the slurry adhering to the wire from splashing upward from the work after colliding with the wire cut-in portion when the wire cut into the work in the last half of slicing of the work.

Therefore, an amount of the slurry that splashes upward from the work to fall onto the inside of the work and that flows in the portion that is cut into by the wire can be suppressed. As a result, the lower end of the work that is cut in a wafer shape can be prevented from adhering one another due to the flowing slurry having a high viscosity and accordingly the bellows motion can be prevented in the vicinity of the work central portion. In this manner, the vibration of the work (vibration in the direction of a right angle to the wire row) can be suppressed during slicing. In addition, a Warp shape of the wafer can be improved particularly in the vicinity of the slicing end portion.

In this case, it is preferable that a lower end of the slurry-splash-blocking members is placed below the work plate.

In this manner, when the lower end of the slurry-splash-blocking members is placed below the work plate, the slurry-splash-blocking members is arranged nearer to the work and accordingly it can be more effectively suppressed that the slurry splashes upward above the work from the wire cut-in portion of the work to reach the work plate. As a result, it can be more effectively suppressed that the slurry flows in the sliced work portion.

Further, it is preferable that a lower surface of the slurry-splash-blocking members is tapered toward its outside.

In this manner, when the lower surface of the slurry-splash-blocking members is tapered toward its outside, the slurry splashing upward above the work from the wire cut-in portion of the work can be efficiently rebounded into the outside of the work.

Moreover, the slurry-splash-blocking members may be movable.

In this manner, when the slurry-splash-blocking members is movable, it can be easily arranged in the vicinity of the wire cut-in portion of the work at any time during slicing and splashing of the slurry from the wire cut-in portion can be more effectively prevented regardless of progress of slicing.

In this case, the slurry-splash-blocking members may be caused to move horizontally or to move parallel along a circular path.

In this manner, when the slurry-splash-blocking members is caused to move horizontally or to move parallel along a circular path, the apparatus can cope with a change in a position of the wire cut-in portion of the work that is pushed down by the work-feeding mechanism during slicing. The distance between the slurry-splash-blocking members and the work (the wire cut-in portion) can be also controlled to be constant.

Alternatively, the slurry-splash-blocking members may be fixed to the work-holding portion.

In this manner, when the slurry-splash-blocking members is fixed to the work-holding portion, the slurry can be prevented from splashing in an inward direction of the work from the wire cut-in portion of the work.

The wire saw apparatus according to the present invention can suppress flowing of the slurry in the sliced work after the slurry splashes upward above the work from the wire cut-in portion of the work. As a result, the bellows motion of the work can be suppressed and the Warp of the wafer to be sliced can be improved.

BRIEF DESCRIPTION OF THE DRAWINGS

FIG. 5(B) shows a result of Comparative Example;

BEST MODE FOR CARRYING OUT THE INVENTION

Although an embodiment according to the present invention will be explained hereinafter, but the present invention is not restricted thereto.

Figure 1:
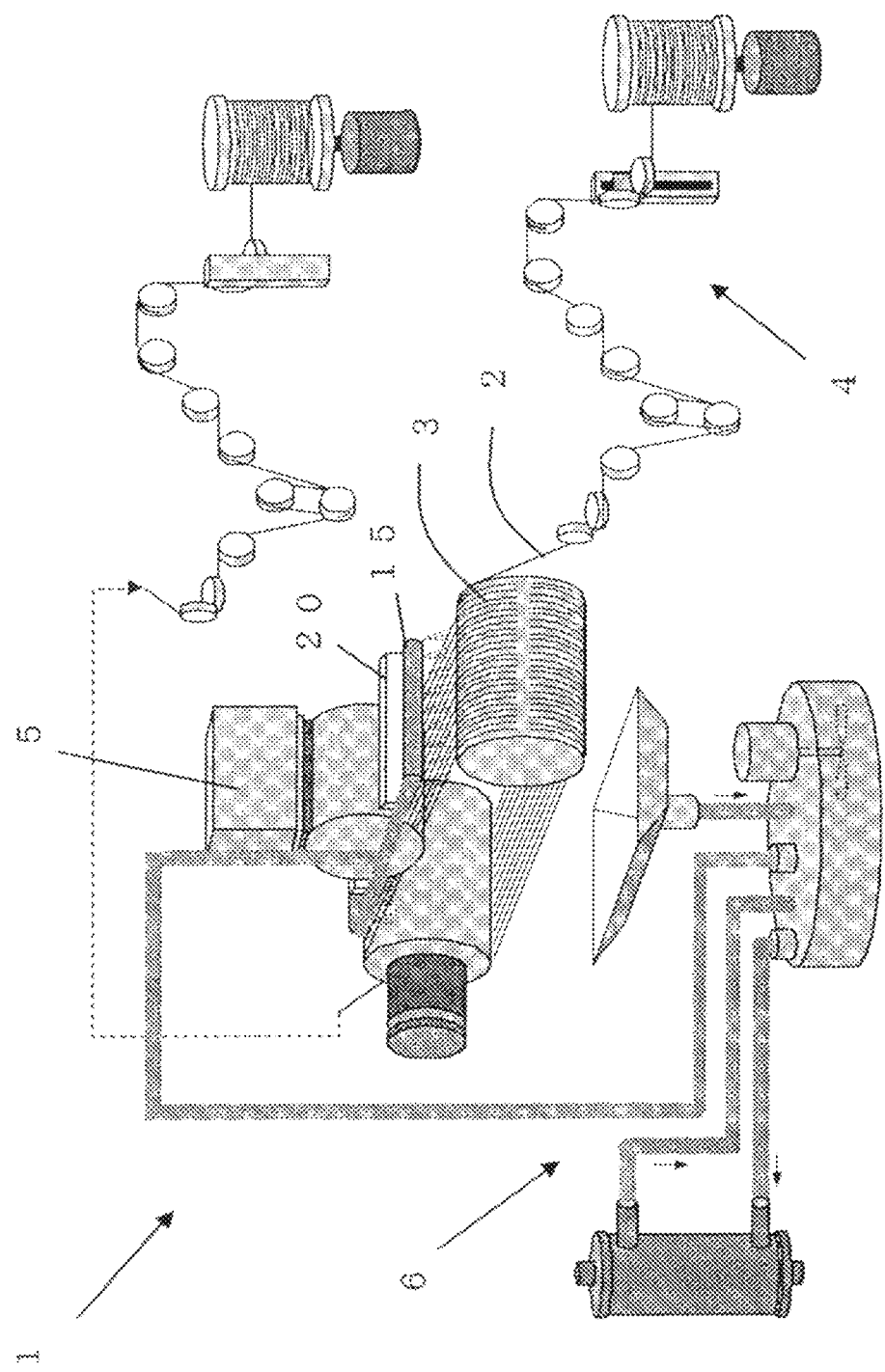
FIG. 1 is a schematic view showing an example of a wire saw apparatus according to the present invention.

FIG. 1 shows an example of a wire saw apparatus according to the present invention. As shown in FIG. 1, a wire saw apparatus 1 according to the present invention includes slurry-splash-blocking members 20. Other mechanisms are not restricted in particular, such as a wire 2 for slicing a work, grooved rollers 3 around which the wire 2 is wound, a mechanism for giving the wire 2 a tensile force 4, a mechanism for feeding the work to be sliced downward 5, a mechanism for supplying a slurry for slicing 6 and the like, and can be the same as a conventional mechanism.

Figure 2:
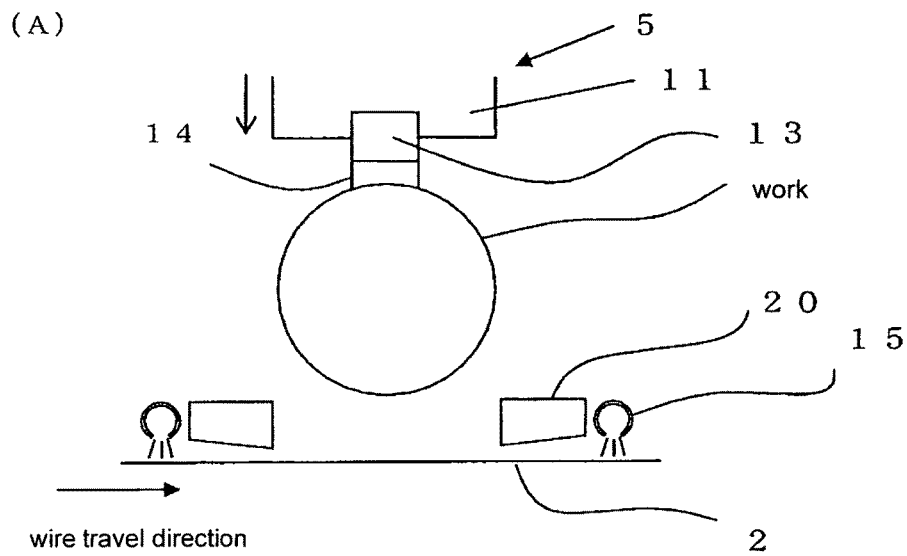
FIG. 2 are explanatory views showing an example of movable slurry-splash-blocking members, wherein 2(A) shows an example before a start of slicing, 2(B) shows an example in case that a work is sliced from a slicing start portion to a central portion and 2(C) shows an example in case that a work is sliced from a central portion to a slicing end portion.
Figure 2:
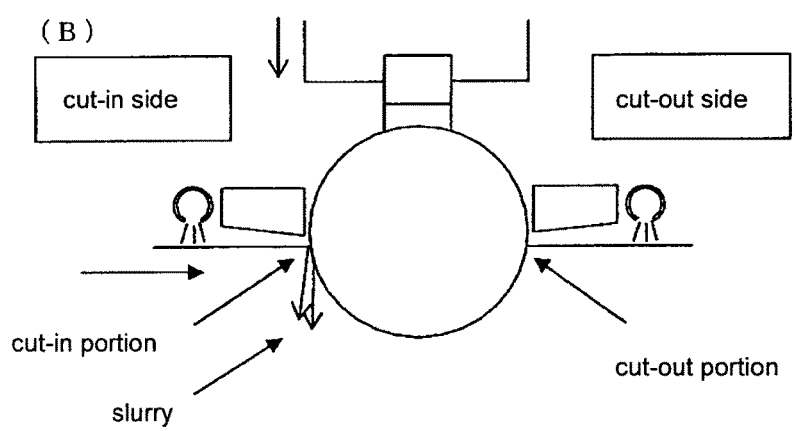
Figure 2:
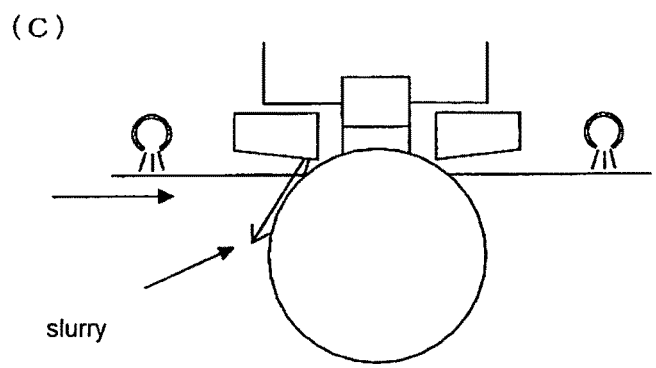

Moreover, FIG. 2 shows an example of movable slurry-splash-blocking members 20. It is to be noted that FIG. 2(A) shows an example before a start of slicing, 2(B) shows an example in case that the work is sliced from the slicing start portion to the central portion and 2(C) shows an example in case that the work is sliced from the central portion to the slicing end portion respectively.

First, the work to be sliced is adhered to a pad plate 14. The pad plate 14 is held by a work plate 13. The pad plate 14 may be, for example, an epoxy resin plate and is adhered to the work with an epoxy adhesive. The work plate 13 is made of an invar material or stainless and is adhered to the pad plate 14 with an epoxy adhesive.

Moreover, a work-holding portion 11 of the work-feeding mechanism 5 holds the work plate 13 by clamping. That is, the work-holding portion 11 holds the work through the pad plate 14 and the work plate 13.

The work held by the work-holding portion 11 of the work-feeding mechanism 5 as described above is fed to the wire 2 placed below by the work-feeding mechanism 5 at the time of slicing.

On the other hand, nozzles 15 are arranged above the wire 2 that is wound around the grooved rollers 3 and axially travels in a reciprocating direction at the time of slicing. When the work is sliced, a slurry can be supplied to the wire 2.

Moreover, the slurry-splash-blocking members 20 are placed below the work-holding portion 11 and furthermore are arranged in the direction of a right angle to a row of the wire 2 on both the wire cut-in side and a wire cut-out side particularly as shown in FIGS. 1 and 2(B)(C). This is because the members need to be placed on both sides of the work since the wire cut-in side and the wire cut-out side periodically reverse due to traveling of the wire in a reciprocating direction.

In the case of an example shown in FIG. 2, the slurry-splash-blocking member 20 is in the shape of block. However, the slurry-splash-blocking member may be in the shape of plate. In addition, as shown in FIG. 2, its lower surface is tapered toward its outside. Naturally, the slurry-splash-blocking member having a flat lower surface can be used. However, in the case of the shape tapered toward its outside as described above, the slurry splashing from the wire cut-in portion of the work can be rebounded outward. That is, it is preferable since splashing of the slurry in an inward direction of the work can be more effectively prevented. For example, it can incline at an angle of 5° or more with respect to a horizontal plane.

Moreover, its size or its thickness and the like is not restricted and it can be configured such that the members are placed between the work-holding portion 11 and the work at the time of finishing slicing the work. But it is preferable that the slurry-splash-blocking Member is in such a size and a thickness that the lower end of the slurry-splash-blocking member 20 is placed below the work plate 13. As a result, the lower end of the slurry-splash-blocking member 20 is not far from the work and the slurry can be effectively prevented from splashing upward from the work and flowing in the inside of the work.

Further, the slurry-splash-blocking members 20 are connected with a computer and the like. The computer can determine an arrangement position appropriately. Moreover, the computer connected with the slurry-splash-blocking members 20 can be also connected with the work-feeding mechanism 5. For example, the position of the slurry-splash-blocking members can be controlled according to an amount of movement of the work pushed down by the work-feeding mechanism 5. The distance between the work (the wire 2 cut-in portion) and the slurry-splash-blocking member 20 can be controlled to be constant under the control of the computer.

A movement way of the slurry-splash-blocking members 20 is not restricted. For example, it can be caused to move horizontally. Since the work is pushed down by the work-feeding mechanism 5 at the time of slicing, in the case of slicing the portion after the central portion of the cylinder-shaped work and the like, the wire cut-in portion of the work moves in an inward direction of the work. When the slurry-splash-blocking members 20 are horizontally movable it can easily follow the wire cut-in portion moving in an inward direction of the work and splashing of the slurry from the wire cut-in portion can be prevented.

Alternatively, it may be cause to move parallel along a circular path and the slurry-splash-blocking members 20 can be caused to finely move along the side face of the cylinder-shaped work.

It can be appropriately configured according to a shape of the work and the like.

Hereinafter, a procedure for preventing the slurry from splashing upward above the work from the wire 2 cut-in portion of the work at the time of slicing using the wire saw apparatus 1 according to the present invention referring to FIG. 2.

First, as shown in FIG. 2(A) the slurry is supplied to the row of the wire 2 that axially travels in a reciprocating direction through the nozzles 15 and the work held by the work-holding portion 11 is pushed down. It is to be noted that the case of traveling of the wire from left to the right as one faces will be described.

Next, as shown in FIG. 2(B), the slurry adhering to the wire 2 collides the side face of the work to rapidly fall below the work from the wire 2 cut-in portion of the work at the time of slicing from the slicing start portion to the central portion of the work.

As further slicing proceeds, the slurry adhering to the wire 2 collides with the side face of the work to splash upward above the wire from the wire cut-in portion of the work at the time of slicing the portion after the central portion of the work.

In this case, since the wire saw apparatus 1 according to the present invention comprises the movable slurry-splash-blocking members 20, the slurry can be prevented from splashing upward above the work from the wire 2 cut-in portion of the work by blocking with the slurry-splash-blocking members 20 moved in the vicinity of the wire 2 cut-in portion of the work.

Moreover, as it is close to the slicing end portion, the wire 2 cut-in portion moves in an inward direction of the work. Therefore, the members can continue to prevent the slurry from splashing upward from the work and in a more inward direction of the work by moving the slurry-splash-blocking members 20 more inward.

Therefore, the slurry can be prevented from splashing upward above the work from the wire 2 cut-in portion of the work by the slurry-splash-blocking members 20. As a result, the splashing slurry does not fall on the work, the slurry having a high viscosity does not flow in the lower end of the work that is already cut in a wafer shape. Accordingly, the bellows motion of the work can be suppressed and the Warp of the work after the last half of slicing can be prevented from degrading.

Moreover, the wire saw apparatus 1 according to the present invention can adopt a fixed slurry-splash-blocking members instead of the movable slurry-splash-blocking members 20 as shown in FIG. 2.

Figure 3:
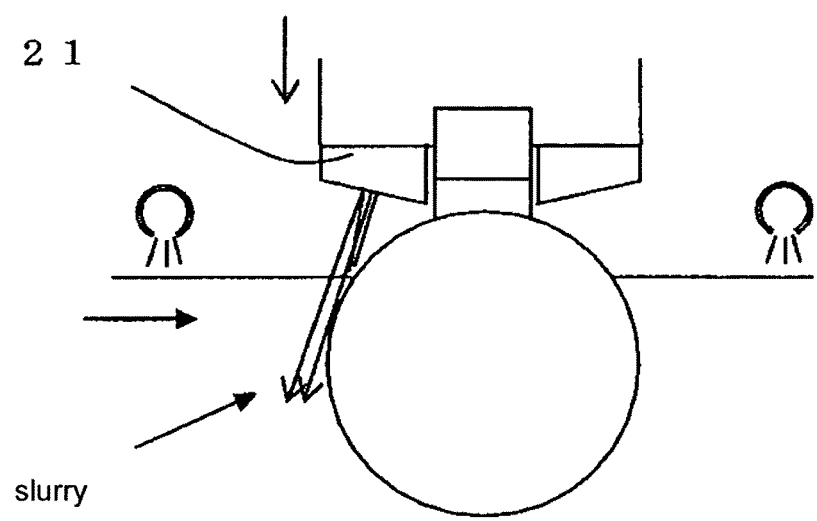
FIG. 3 is a explanatory view showing an example of fixed slurry-splash-blocking members.

FIG. 3 shows an example of slurry-splash-blocking members 21 fixed to the work-holding portion 11.

As shown in FIG. 3, the slurry-splash-blocking members 21 are placed to fix to a lower surface of the work-holding portion 11. A way for fixing is not restricted in particular. An adhesive, a screw or clamping can be used. Moreover, a shape, a size or a thickness of the slurry-splash-blocking member 21 is not restricted in particular but those can be the same as the movable slurry-splash-blocking member 20. It is preferable that its size or the like is adjusted in such a manner that the members are not cut by the wire 2 traveling in a reciprocating direction.

It is to be noted that in the case of the fixed member it is particularly desirable that its lower surface is tapered toward its outside. This is because it is difficult to always keep the distance between the slurry-splash-blocking members 21 and the work (a wire 2 cut-in portion of the work) near as compared with the movable members. Thus, it is desirable that the slurry splashing from the cut-in portion is always rebounded outward and falling of the splashing slurry in an inward direction of the work is prevented using the members in which its lower surface is tapered.

The present invention will be explained in more detail based on examples, but the present invention is not restricted thereto.

EXAMPLE

A wire saw apparatus according to the present invention having the fixed slurry-splash-blocking members 21 shown in FIG. 3 was used to slice a silicon ingot having a diameter of 300 mm and an axial length of 300 mm into wafers, thereby 275 sliced wafers were obtained.

Figure 4:
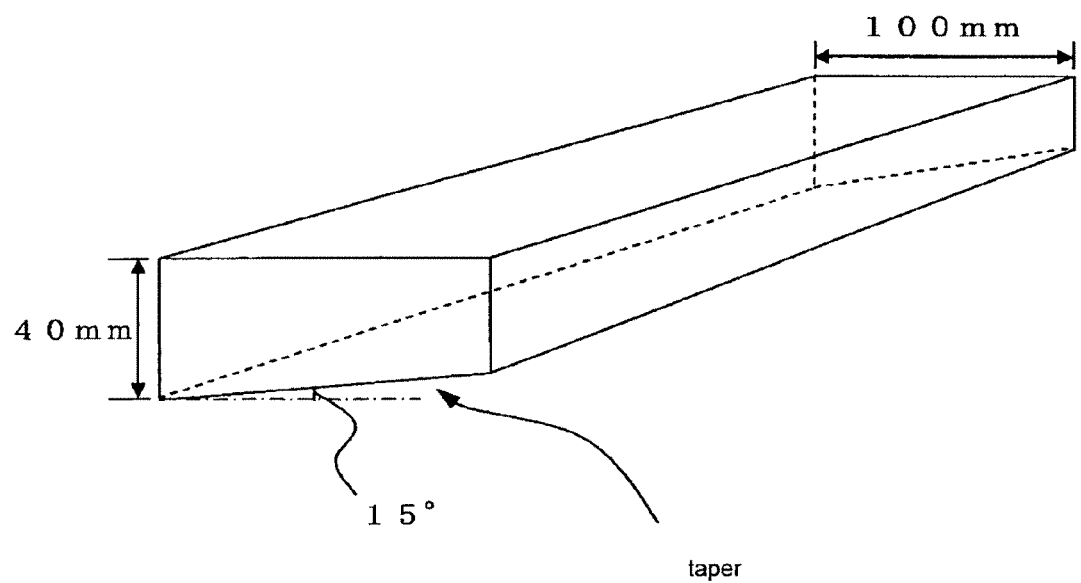
FIG. 4 is a diagrammatical perspective view showing a fixed slurry-splash-blocking member used in Example.

It is to be noted that the fixed slurry-splash-blocking members 21 that were made of vinyl chloride resin and had a block shape in which a cross section was of trapezoid shape were prepared. A diagrammatical perspective view of the whole shape of this fixed slurry-splash-blocking member is shown in FIG. 4.

Moreover, the prepared slurry-splash-blocking members were fixed to the work-holding portion with a screw as shown in FIG. 3. At the time, the slurry-splash-blocking members were fixed to the work-holding portion in the direction where the lower surface of the slurry-splash-blocking members was tapered toward its outside in such a manner that the lower end of the slurry-splash-blocking members protruded downward from the work plate. The wire saw apparatus according to the present invention was prepared in this way.

A wire having a diameter of 160 μm was used, a tensile force of 2.5 kgf was applied to cause the wire to travel in a reciprocating direction at an average speed of 500 m/min in a cycle of 60 s/c, therewith the slurry was supplied to the wire through the nozzles and the silicon ingot was pressed against the wire row by the work-feeding mechanism to perform slicing, thereby sliced wafers were obtained.

When the present inventor observed the work during slicing of the work, the slurry adhering to the wire after supplying to the wire through the nozzle once splashed upward at the time of colliding with the side face of the work. However, the splashing slurry was rebounded into the outside of the work due to the tapered lower surface of the slurry-splash-blocking members in which its lower end protruded downward from the work plate. That is, the slurry was able to be prevented from splashing upward from the work largely and falling in an inward direction of the work unlike the later-explained Comparative Example in which a work was sliced using a conventional wire saw apparatus. In this manner, an amount of the slurry splashing in an inward direction of the work was able to be greatly suppressed.

Furthermore, the bellows motion of the work was suppressed and a vibration of the work (in the direction of a right angle to the wire row) hardly occurred.

Figure 5:
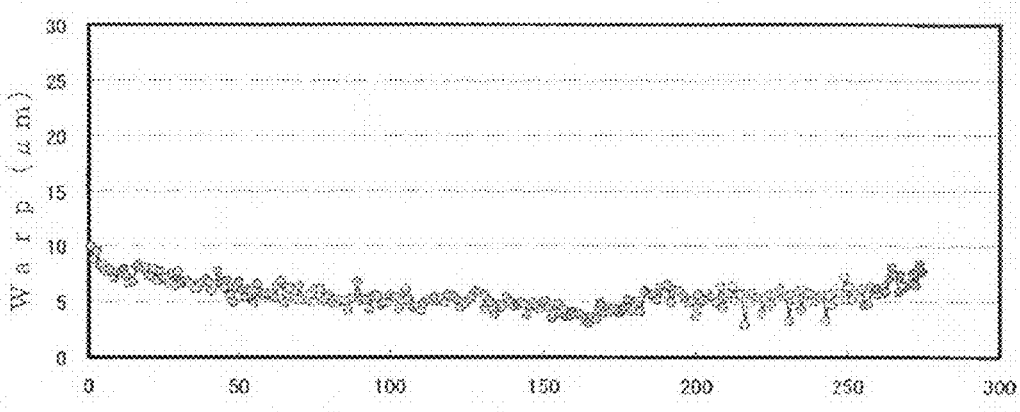
FIG. 5 are graphs showing a measurement result of Warp regarding all sliced wafers, wherein 5(A) shows a result of Example
Figure 5:
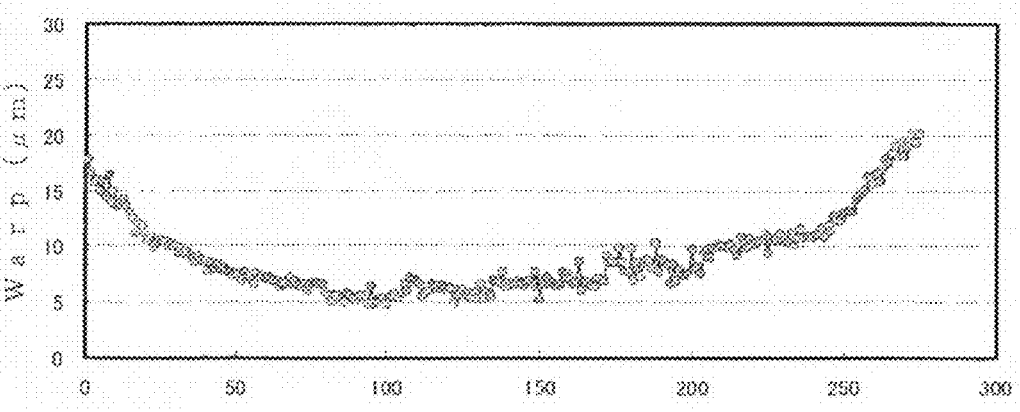

The Warp was practically measured by a shape measurement regarding all sliced wafers in Example. FIG. 5(A) shows a measurement result of the Warp in Example.

As shown in FIG. 5(A), it can be understood that in Example in which the work was sliced using the wire saw apparatus according to the present invention, the Warp was able to be suppressed to 10 μm or less. The Warp reached 20 μm in the later-explained Comparative Example. It can be understood that the Warp can be remarkably improved using the wire saw apparatus according to the present invention.

COMPARATIVE EXAMPLE

The same silicon ingot was sliced in the same conditions as Example except that a conventional wire saw apparatus without the slurry-splash-blocking members were used.

When the present inventor observed the work during slicing of the work, the slurry that collided with the side face of the work greatly splashed in an inward direction of the work to reach the work plate at the time of slicing the portion after the central portion of the work. Afterward a large amount of the slurry fell onto the inside of the work.

Moreover, the bellows motion of the work remarkably occurred and a large amplitude vibration of the work was observed. An intense vibration occurred in the vicinity of both end faces of the work.

FIG. 5(B) shows a measurement result of the Warp regarding all sliced wafers in Comparative Example.

As shown, it can be understood that in Comparative Example in which the work was sliced using the conventional wire saw apparatus, the Warp became large particularly in the end face side of the work (about 1-30th and 246-275th of the wafer in FIG. 5(B)). This corresponds the portion of the work where the intense vibration was observed.

Figure 6:
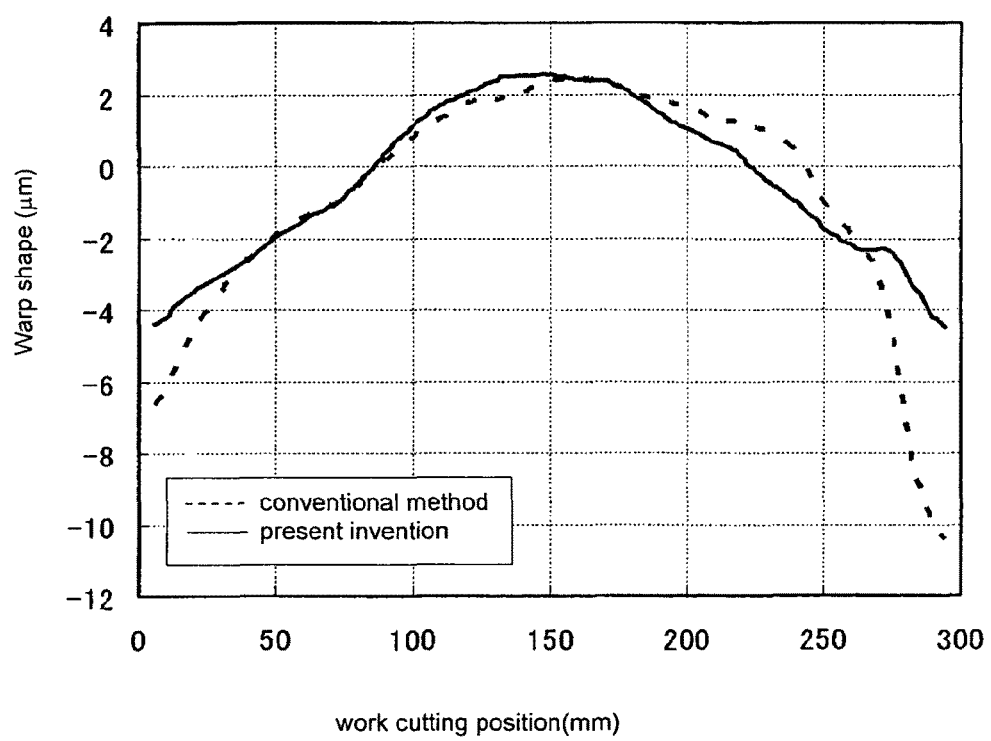
FIG. 6 is a graph showing a measurement result of Warp cross-sectional shapes of a sliced wafer in the slicing direction regarding the sliced wafers in Example and Comparative Example.
Figure 7:
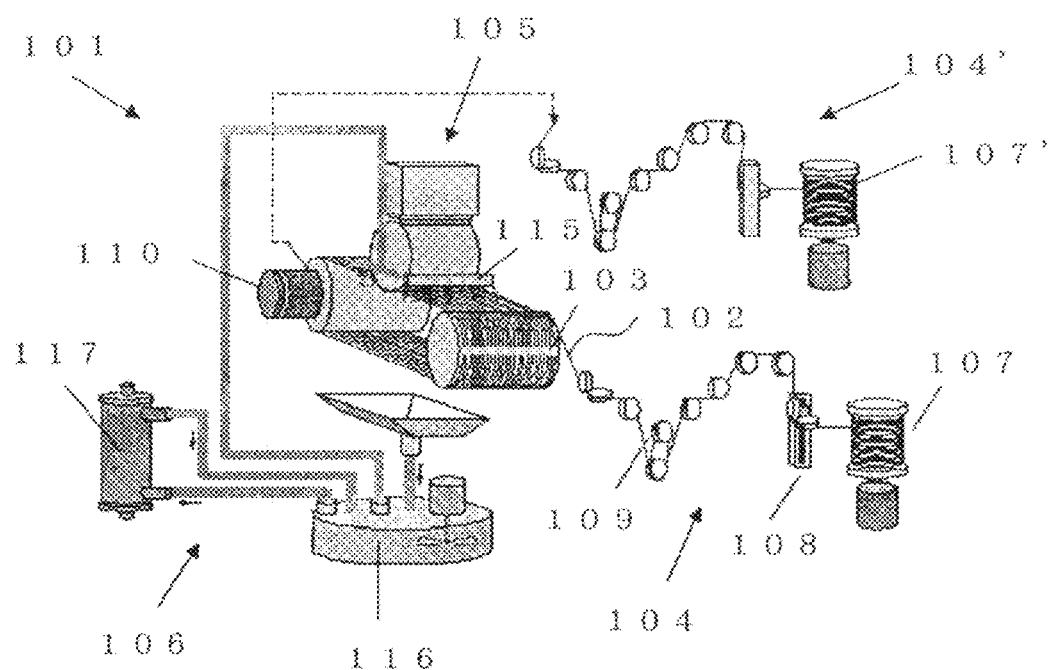
FIG. 7 is a schematic view showing an example of a conventional wire saw apparatus.
Figure 8:
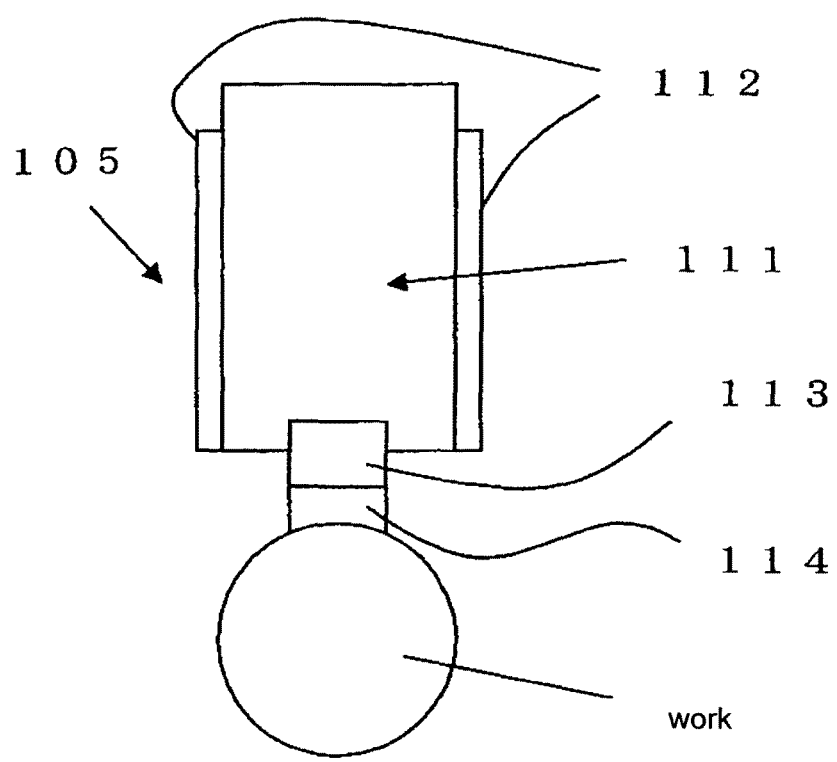
FIG. 8 is a schematic view showing an example of an work-feeding mechanism.
Figure 9:
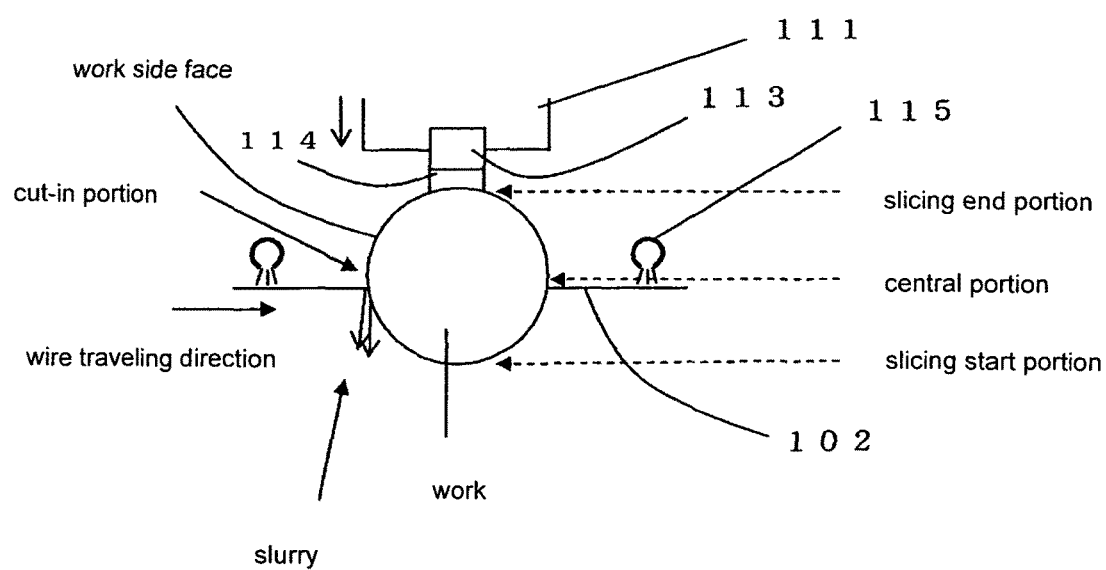
FIG. 9 is a explanatory view showing a flow of a slurry at the time of slicing a portion from a slicing start portion to a central portion of a work using a conventional wire saw apparatus.
Figure 10:
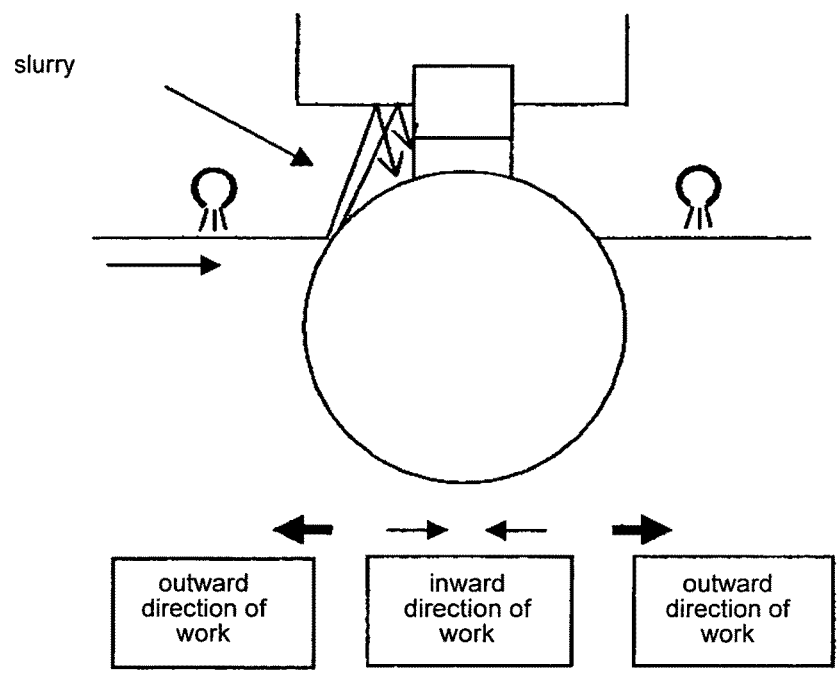
FIG. 10 is a explanatory view showing a flow of a slurry at the time of slicing a portion after a central portion of a work using a conventional wire saw apparatus.
Figure 11:
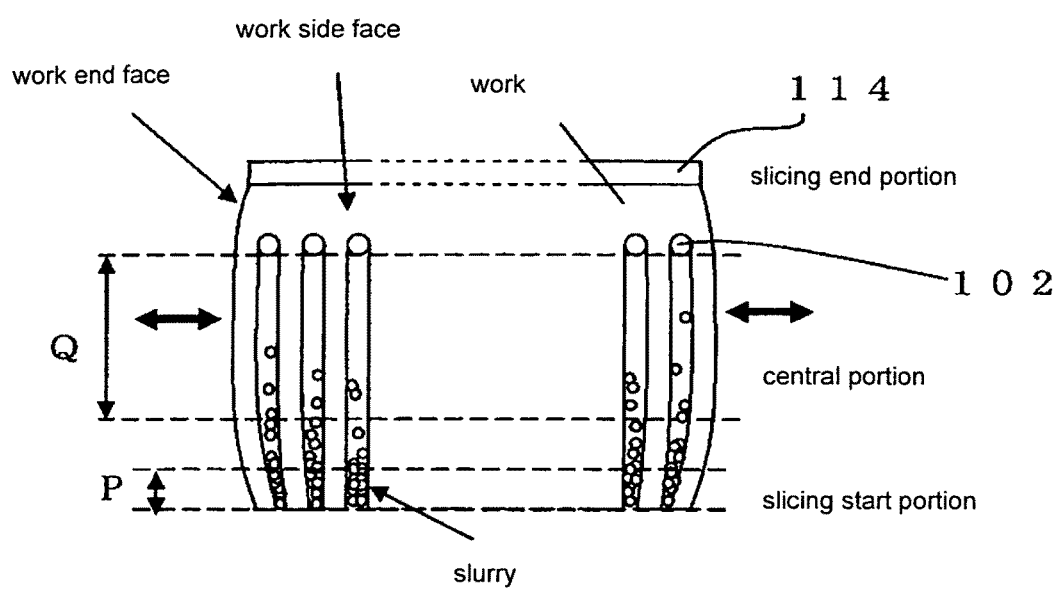
FIG. 11 is a explanatory view showing a condition where a slurry flows in a portion that is cut into by a wire.

FIG. 6 shows a measurement result of the Warp shape of the sliced wafer in slicing direction regarding 1th slicing wafer from the side where a new wire was supplied that was obtained in Example and Comparative Example.

The solid line shows the case of the present invention, that is, Example and the dotted line shows the case of the conventional apparatus, that is, Comparative Example. It can be understood that as will be noted from the portion where the work cutting position is after the central portion (150 mm), in particular after 250 mm, a change in the Warp shape from the central portion to the slicing end portion can be remarkably suppressed in Example compared with Comparative Example. It can be considered that this is because the bellows motion of the work can be suppressed at the time of slicing the portion after the central portion of the work as described above.

As explained above, the wire saw apparatus according to the present invention can effectively prevent the slurry from splashing from the wire cut-in portion of the work to fall above the work. Thus, the bellows motion of the work that occurs at the time of slicing the portion after the central portion of the work can be suppressed and the Warp shape in the last half of slicing can be improved. As a result, the sliced wafer having a remarkably better Warp than a conventional wafer can be provided.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

In Example described above, the case of using the wire saw apparatus having the fixed slurry-splash-blocking members but it is not restricted thereto. The wire saw apparatus having the movable slurry-splash-blocking members can be used. In this case, the slurry-splash-blocking members can be placed in such a manner that it is closer to the wire cut-in portion of the work, splashing of the slurry can be more effectively prevented and the sliced wafer having a still better Warp can be provided.

Moreover, In Example described above, the fixed slurry-splash-blocking members are made of vinyl chloride resin. In this case, it can be configured in such a size that its lower end protrudes downward from the slicing end position of the work and can be cut together with the work. On the other hand, in the case that its lower end is placed above the slicing end position and that it is configured in such a size that it does not contact with the work at the time of finishing slicing of the work, the slurry-splash-blocking members can be made of metal materials such as stainless and the like.

The invention claimed is:

1. A wire saw apparatus, comprising:
   a wire which is wound around a plurality of grooved rollers and axially travels in a reciprocating direction;
   a nozzle for supplying a slurry to the wire; and
   a work-feeding mechanism which feeds a work to be sliced towards the wire by holding and pushing down the work, and causes the work to be sliced into wafers by pressing and feeding the work held by the work-feeding mechanism against the wire while a slurry is supplied to the wire through the nozzle, a work-holding portion of the work-feeding mechanism holding the work through a pad plate adhered to the work to be sliced and a work plate holding the pad plate; and
   plate-shaped or block-shaped slurry-splash-blocking members for blocking the slurry splashing from a wire cut-in side of the work that are arranged in the direction of a right angle to a row of the wire wound around the grooved rollers below the work-holding portion and on both the wire cut-in side and a wire cut-out side, a lower end of the slurry-splash-blocking members being placed below the work plate, and a lower surface of the slurry-splash-blocking members being tapered toward its outside.

2. The wire saw apparatus according to claim 1, wherein the slurry-splash-blocking members are movable.

3. The wire saw apparatus according to claim 2, wherein the slurry-splash-blocking members are caused to move horizontally or to move parallel along a circular path.

4. The wire saw apparatus according to claim 1, wherein the slurry-splash-blocking members are fixed to the work-holding portion.

\* \* \* \* \*